United States Patent
Barker et al.

(10) Patent No.: US 10,815,810 B2
(45) Date of Patent: Oct. 27, 2020

(54) BOAS ASSEMBLIES WITH AXIAL SUPPORT PINS

(71) Applicant: UNITED TECHNOLOGIES CORPORATION, Farmington, CT (US)

(72) Inventors: William M. Barker, North Andover, MA (US); Daniel J. Whitney, Topsham, ME (US); Michael G. McCaffrey, Windsor, CT (US); Thomas E. Clark, Sanford, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 104 days.

(21) Appl. No.: 16/244,409

(22) Filed: Jan. 10, 2019

(65) Prior Publication Data

US 2020/0224544 A1    Jul. 16, 2020

(51) Int. Cl.
*F01D 11/08* (2006.01)
*F01D 25/24* (2006.01)

(52) U.S. Cl.
CPC ............ *F01D 11/08* (2013.01); *F01D 25/243* (2013.01); *F05D 2230/64* (2013.01); *F05D 2240/11* (2013.01); *F05D 2240/56* (2013.01); *F05D 2260/30* (2013.01); *F05D 2300/6033* (2013.01)

(58) Field of Classification Search
CPC .... F01D 25/246; F01D 11/08; F05D 2240/11; F05D 2240/56
See application file for complete search history.

(56) References Cited

U.S. PATENT DOCUMENTS

| | | | | |
|---|---|---|---|---|
| 5,609,469 | A * | 3/1997 | Worley | F01D 11/005 415/173.1 |
| 6,884,026 | B2 | 4/2005 | Glynn et al. | |
| 7,494,317 | B2 * | 2/2009 | Keller | F01D 11/025 415/136 |
| 9,863,265 | B2 * | 1/2018 | Stapleton | F04D 29/321 |
| 9,945,244 | B2 | 4/2018 | Roberts et al. | |
| 10,030,541 | B2 | 7/2018 | Vetters et al. | |
| 10,087,770 | B2 | 10/2018 | Vetters et al. | |
| 10,598,045 | B2 * | 3/2020 | Tableau | F01D 25/28 |

(Continued)

FOREIGN PATENT DOCUMENTS

| | | |
|---|---|---|
| EP | 3081759 | 10/2016 |
| EP | 3118417 | 1/2017 |

(Continued)

OTHER PUBLICATIONS

European Patent Office, European Search Report dated Apr. 23, 2020 in Application No. 20150970.0.

*Primary Examiner* — Nathaniel E Wiehe
*Assistant Examiner* — Jackson N Gillenwaters
(74) *Attorney, Agent, or Firm* — Snell & Wilmer L.L.P.

(57) ABSTRACT

A blade outer air seal assembly may comprise a blade outer air seal segment and a blade outer air seal support coupled to the blade outer air seal segment. The blade outer air seal segment may comprise a forward rail and an aft rail. The forward rail may be castellated. The blade outer air seal support may comprise an aft flange and a first forward flange. A pin may be disposed through the aft rail, the aft flange, the first forward flange, and the forward rail.

16 Claims, 6 Drawing Sheets

(56) References Cited

U.S. PATENT DOCUMENTS

| | | |
|---|---|---|
| 2004/0062639 A1 | 4/2004 | Glynn et al. |
| 2015/0167498 A1* | 6/2015 | Todorovic ............. F04D 29/644 |
| | | 415/214.1 |
| 2016/0097294 A1* | 4/2016 | Wilson ................. F16J 15/3268 |
| | | 415/173.1 |
| 2016/0153313 A1* | 6/2016 | Ivanov ............... B23K 15/0046 |
| | | 415/182.1 |
| 2016/0319686 A1* | 11/2016 | Shi ........................... F01D 9/02 |
| 2017/0306782 A1* | 10/2017 | Shah ....................... F01D 9/041 |
| 2018/0142572 A1* | 5/2018 | Quennehen ........... F01D 25/246 |
| 2018/0274367 A1* | 9/2018 | Stanka .................. F01D 25/246 |
| 2018/0363499 A1* | 12/2018 | Smoke .................... F01D 11/08 |

FOREIGN PATENT DOCUMENTS

| | | |
|---|---|---|
| EP | 3401509 | 11/2018 |
| WO | 2016146932 | 9/2016 |

\* cited by examiner

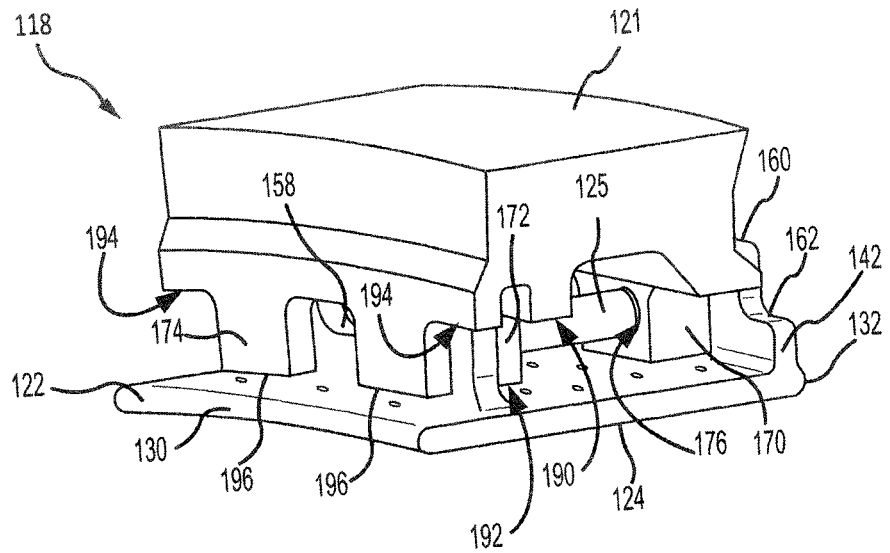
FIG. 4A
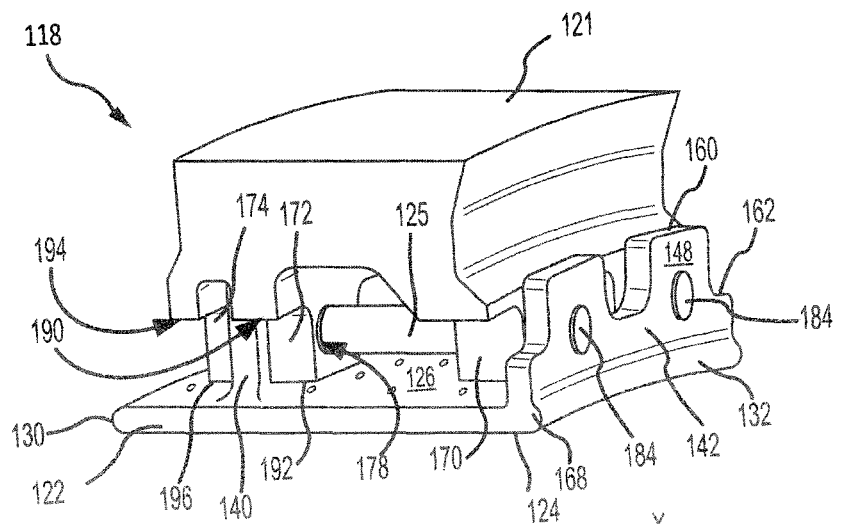
FIG. 4B
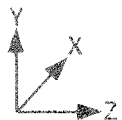

BOAS ASSEMBLIES WITH AXIAL SUPPORT PINS

FIELD

The present disclosure relates to gas turbine engines and, more specifically, to blade outer air seal (BOAS) assemblies with axial support pins.

BACKGROUND

A gas turbine engine generally includes a fan section, a compressor section, a combustor section, and a turbine section. The fan section drives air along a bypass flow path and a core flow path. In general, during operation, air is pressurized in the compressor section and then mixed with fuel and ignited in the combustor section to generate combustion gases. The combustion gases flow through the turbine section, which extracts energy from the combustion gases to power the compressor section and generate thrust.

The fan section, compressor section, and/or the turbine section may each include rotatable blade assemblies and non-rotating vane assemblies. A blade outer air seal (BOAS) may positioned radially outward of the tips of the rotatable blades. The BOAS may be formed from ceramic matrix composite (CMC). A BOAS support may be employed to couple or otherwise secure the CMC BOAS to an engine casing. For example, a support hook of the BOAS support may engage the CMC BOAS. Metallic and/or cantilevered support hooks are at risk of excessive deflection when mated to a CMC structure (e.g., a CMC BOAS). Deflection or changes in shape may increase corner stresses, which can lead to delamination of the CMC BOAS.

SUMMARY

A blade outer air seal assembly is disclosed herein. In accordance with various embodiments, the blade outer air seal assembly may comprise a blade outer air seal segment and a blade outer air seal support coupled to the blade outer air seal segment. The blade outer air seal segment may comprise a forward rail and an aft rail. The forward rail may be castellated. The blade outer air seal support may comprise an aft flange and a first forward flange. A pin may be disposed through the aft rail, the aft flange, the first forward flange, and the forward rail.

In various embodiments, a seal may be disposed aft of the aft rail. In various embodiments, the seal may contact an aft end of the pin. In various embodiments, the aft flange may comprise an aft protrusion, and the seal may contact the aft protrusion.

In various embodiments, the blade outer air seal support may further comprise a second forward flange located forward of the first forward flange. A forward end of the pin may contact the second forward flange. In various embodiments, the second forward flange may be castellated, and a proximal surface of the forward rail may be axially aligned with a distal surface of the second forward flange.

In various embodiments, the blade outer air seal segment may define a plurality of diffusion holes extending from a radially outward surface of the blade outer air seal segment to a radially inward surface of the blade outer air seal segment.

In various embodiments, a circumferential seal may be located circumferentially adjacent to the forward rail. A circumferential length of the forward rail may be less than a circumferential length of the blade outer air seal segment.

A turbine section of a gas turbine engine is also disclosed herein. In accordance with various embodiments, the turbine section may comprise a blade configured to rotate about an engine central longitudinal axis, and a blade outer air seal assembly located radially outward of the blade. The blade outer air seal assembly may comprise a blade outer air seal segment including a forward rail and an aft rail, and a blade outer air seal support coupled to the blade outer air seal segment. The forward rail of the blade outer air seal segment may be castellated. The blade outer air seal support may comprise an aft flange and a first forward flange. A pin may be disposed through the aft rail, the aft flange, the first forward flange, and the forward rail.

In various embodiments, the blade outer air seal assembly may further comprise a seal disposed aft of the aft rail. The seal may contact an aft end of the pin.

In various embodiments, the blade outer air seal assembly may further comprise a seal disposed aft of the aft rail, and the seal may contact an aft protrusion extending from the aft flange. In various embodiments, the seal may comprise a brush seal. The brush seal may include a backing plate and a plurality of bristles coupled to the backing plate. The backing plate may contact the aft protrusion.

In various embodiments, the blade outer air seal support may further comprise a second forward flange located forward of the first forward flange. A forward end of the pin may contact the second forward flange. In various embodiments, the second forward flange may be castellated, and a proximal surface of the forward rail may be axially aligned with a distal surface of the second forward flange.

In various embodiments, the second forward flange may define a pin receptacle, and the forward end of the pin may be located within the pin receptacle.

A blade assembly of a gas turbine engine is also disclosed herein. In accordance with various embodiments, the blade assembly may comprise a blade configured to rotate about an axis, and a blade outer air seal assembly located radially outward of the blade. The blade outer air seal assembly may comprise a blade outer air seal segment including a forward rail and an aft rail, and a blade outer air seal support coupled to the blade outer air seal segment. The forward rail may be castellated. The blade outer air seal support may comprise an aft flange and a first forward flange. A pin may be disposed through the aft rail, the aft flange, the first forward flange, and the forward rail.

In various embodiments, the blade outer air seal support may further comprise a second forward flange located forward of the first forward flange. A forward end of the pin may contact the second forward flange. In various embodiments, the second forward flange may be castellated, and a proximal surface of the forward rail may be axially aligned with a distal surface of the second forward flange.

In various embodiments, the blade outer air seal assembly may further comprise a seal disposed aft of the aft rail. The seal may contact an aft end of the pin.

In various embodiments, the blade outer air seal assembly may further comprise a seal disposed aft of the aft rail, and the seal may contact an aft protrusion extending from the aft flange.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

FIGS. 4A and 4B illustrate a BOAS assembly with axial support pins, in accordance with various embodiments;

Figure 1:
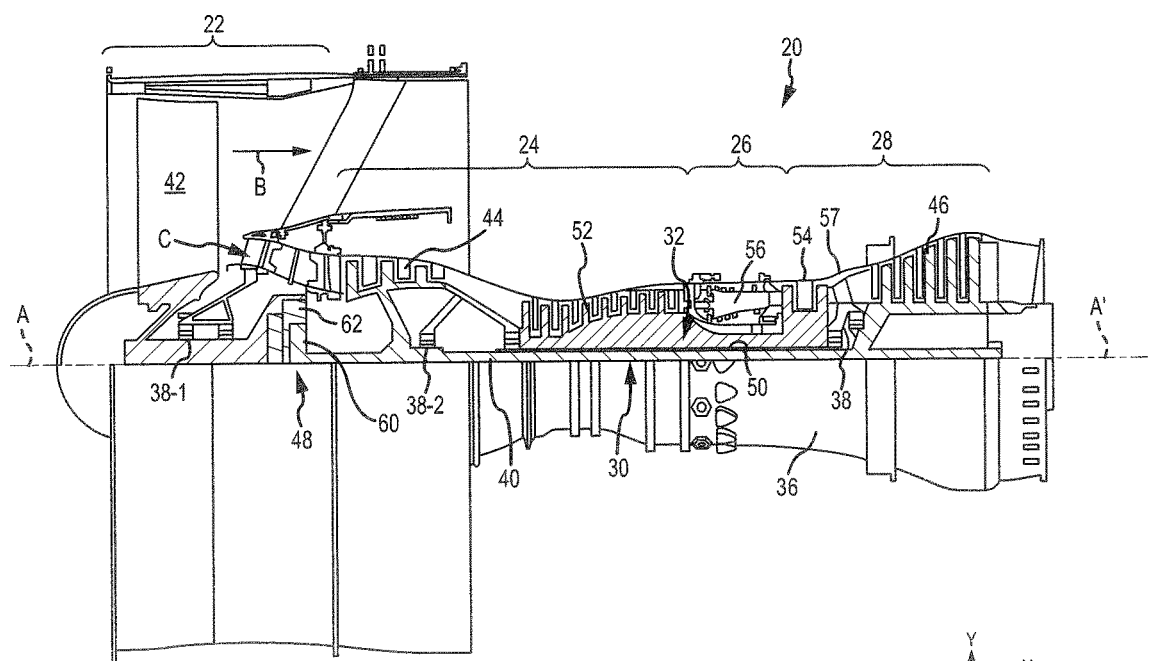
FIG. 1 illustrates a cross-sectional view of an exemplary gas turbine engine, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact.

Cross hatching lines and surface shading may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with a tail (e.g., the back end) of an aircraft, or generally, to the direction of exhaust of a gas turbine engine. As used herein, "forward" refers to the direction associated with a nose (e.g., the front end) of the aircraft, or generally, to the direction of flight or motion. As used herein, "distal" refers to a direction or component radially outward, or generally, away from the engine central longitudinal axis. As used herein, "proximal" refers to a direction or component radially inward, or generally, towards the engine central longitudinal axis.

A first component that is "radially outward" of a second component means that the first component is positioned at a greater distance away from a common axis (e.g., the engine central longitudinal axis) than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component.

With reference to FIG. 1, an exemplary gas turbine engine 20 is provided, in accordance with various embodiments. Gas turbine engine 20 may be a two-spool turbofan that generally incorporates a fan section 22, a compressor section 24, a combustor section 26, and a turbine section 28. In operation, fan section 22 drives fluid (e.g., air) along a bypass flow-path B, while compressor section 24 drives fluid along a core flow-path C for compression and communication into combustor section 26 and then expansion through turbine section 28. Although gas turbine engine 20 is depicted as a turbofan gas turbine engine herein, it should be understood that the concepts described herein are not limited to use with turbofans as the teachings may be applied to other types of turbine engines, including engines having more or less than two spools.

Gas turbine engine 20 may generally comprise a low speed spool 30 and a high speed spool 32 mounted for rotation about an engine central longitudinal axis A-A' relative to an engine static structure 36 (also referred to as an engine casing structure) via several bearing systems 38, 38-1, and 38-2. Engine central longitudinal axis A-A' is oriented in the z direction on the provided xyz axes. The z direction on the provided xyz axes refers to the axial direction. As used herein, the terms "radial" and "radially" refer to directions towards and away from central longitudinal axis A-A' and the z-axis. As used herein, the terms "circumferential" and "circumferentially" refer to directions about central longitudinal axis A-A' and the z-axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 and high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion. Fan section 22, compressor section 24, and/or turbine section 28 may each include one or more stages or sets of blades assemblies configured to rotate about engine central longitudinal axis A-A' and one or more stages or sets of stationary vanes axially interspersed with the blade assemblies but non-rotating about engine central longitudinal axis A-A'.

Figure 2:
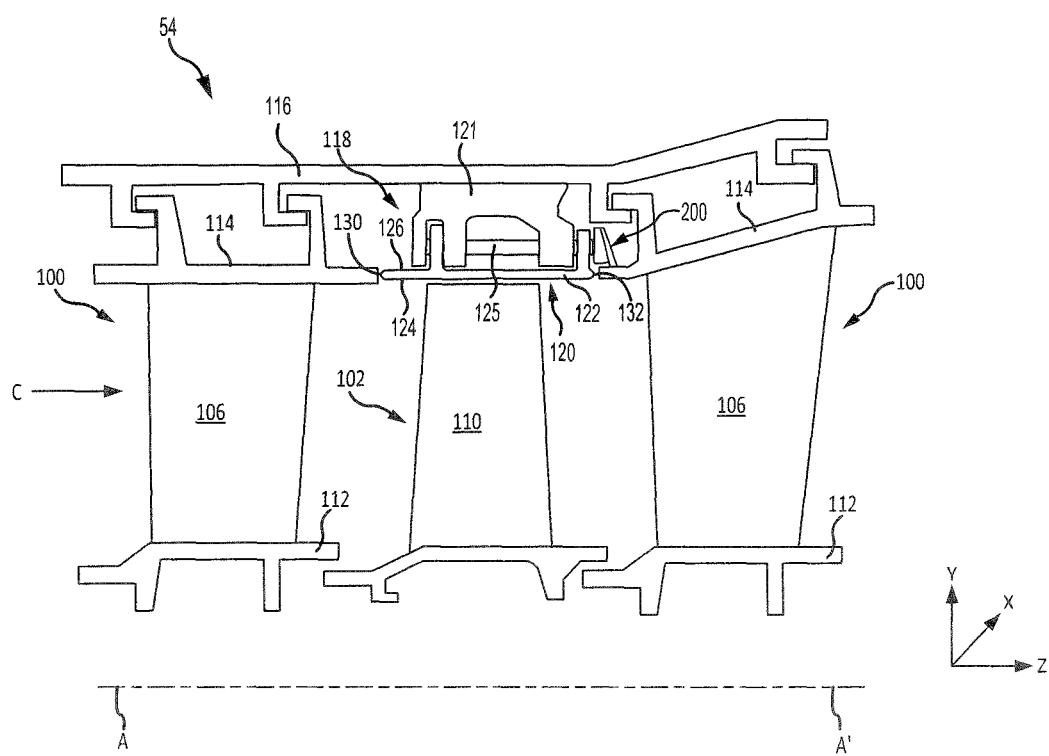
FIG. 2 illustrates a schematic cross-section of a portion of a high pressure turbine section of the gas turbine engine of FIG. 1, in accordance with various embodiments, in accordance with various embodiments.

Referring to FIG. 2, and with continued reference to FIG. 1, a portion of high pressure turbine 54 is illustrated, in accordance with various embodiments. High pressure turbine 54 may include non-rotating vane assemblies 100 and rotating blade assemblies 102 (one shown) axially interspersed with vane assemblies 100. Vane assemblies 100 each include a plurality of vanes 106 positioned about engine central longitudinal axis A-A'. Each vane 106 may extend between an inner vane platform 112 and an outer vane platform 114. Outer vane platform 114 may be configured to couple or otherwise support attachment of vane assembly 100 to a turbine case structure 116. Turbine case structure 116 may form a portion of engine static structure 36 in FIG. 1. Vane assemblies 100 comprise static structures that do not rotate relative to engine central longitudinal axis A-A'. Vane assemblies 100 may help direct the flow of fluid (e.g., airflow along core flow path C) received by and output from blade assemblies 102.

Blade assemblies 102 each include a plurality of blades 110 configured for rotation about engine central longitudinal axis A-A'. For example, blades 110 may rotate in response to receiving a flow of fluid (e.g., combustion gases) from combustor 56. Power from the flow may be converted to mechanical power, or torque, by blades 110. Blade assembly 102 may also include a blade outer air seal assembly 118 (BOAS assembly 118). BOAS assembly 118 includes a blade outer air seal 120 (BOAS 120) and a blade outer air seal support 121 (BOAS support 121). BOAS support 121 may couple, or otherwise secure, BOAS 120 to turbine case structure 116. BOAS support 121 may be coupled (e.g., via pins, hooks, fasteners, etc.) to turbine case structure 116. In various embodiments, BOAS support 121 may be integral to turbine case structure 116. In various embodiments, BOAS support 121 may be formed from a metal or metal alloy. For example, BOAS support 121 may comprise a cobalt-based alloy, a nickel-based super alloy, or any other metal or metal alloy.

BOAS 120 is disposed radially outward of blades 110. BOAS 120 is configured to provide a seal and reduce or prevent hot gases from leaking over the tips of blades 110. In various embodiments, BOAS 120 may be segmented. For example, BOAS 120 may comprise a plurality of arcuate blade outer air seal segments 122 (BOAS segments 122), arranged in circumferential series around engine central longitudinal axis A-A'. BOAS segments 122 may be coupled to BOAS support 121 via axially extending pins 125. Pins 125 may be located through BOAS segments 122 and BOAS support 121. In various embodiments, pins 125 may be formed from a metal or metal alloy. For example, pins may comprise a cobalt-based alloy, a nickel-based super alloy, or any other metal or metal alloy. In various embodiments, pins 125 may comprise a wear coating. For example, pins 125 may be coated with a cobalt-based wear coating.

Figure 3:
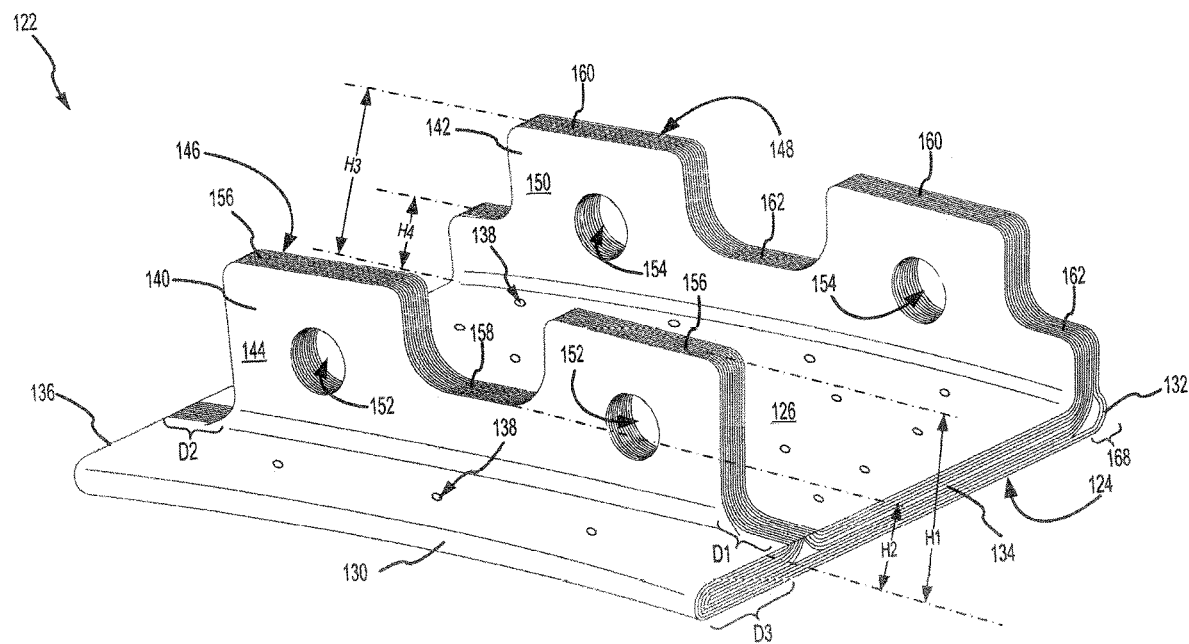
FIG. 3 illustrates a BOAS segment, in accordance with various embodiments.

With reference to FIG. 3, a BOAS segment 122 of BOAS 120 is illustrated, in accordance with various embodiments. BOAS segment 122 may be formed from a CMC. For example, BOAS segment 122 may be formed from textile layers (or plies) comprising woven, braided, knitted, and/or 3D printed fibers (e.g., SiC fibers, carbon fibers, etc.). A ceramic matrix may be formed around the fibers. The ceramic matrix may be formed using chemical vapor infiltration or deposition ("CVI/CVD").

In accordance with various embodiments, BOAS segment 122 includes a radially inward (or first) surface 124 and a radially outward (or second) surface 126. When installed in blade assembly 102, with momentary reference to FIG. 2, radially inward surface 124 of BOAS segments 122 is oriented toward blades 110 and engine central longitudinal axis A-A', and radially outward surface 126 of BOAS segments 122 is oriented away from blades 110 and engine central longitudinal axis A-A'.

Returning to FIG. 3, BOAS segment 122 includes a forward edge 130, an aft edge 132, a first circumferential edge 134, and a second circumferential edge 136. First and second circumferential edges 134, 136 extend axially between forward edge 130 and aft edge 132. Forward and aft edges 130, 132 extend circumferentially between first circumferential edge 134 and second circumferential edge 136. BOAS segments 122 may be arranged in circumferential series such that the first circumferential edge 134 of a first BOAS segment 122 is circumferentially adjacent to the second circumferential edge 136 of a second BOAS segment 122.

A plurality of diffusor holes 138 may be formed in BOAS segment 122. Stated differently, BOAS segment 122 may define diffusor holes 138. Diffusor holes 138 extend completely through BOAS segment 122 (i.e., from radially outward surface 126 to radially inward surface 124). Diffusor holes 138 may be angled, or otherwise configured, to form a cooling film along radially inward surface 124. For example, the walls defining diffusor holes 138 may be non-perpendicular to radially inward surface 124 and/or radially outward surface 126.

BOAS segment 122 includes a forward (or first) radially extending wall or rail 140 and an aft (or second) radially extending wall or rail 142. Forward and aft rails 140, 142 are each oriented substantially perpendicular to radially outward surface 126 of BOAS segment 122. As used in the previous context, "substantially perpendicular" means ±5° from perpendicular. Forward rail 140 is located proximate (i.e., closer to) forward edge 130, as compared to aft rail 142. Aft rail 142 is located proximate (i.e., closer to) aft edge 132, as comparted to forward rail 140.

Forward rail 140 includes an forward facing surface 144 and an aft facing surface 146. Aft rail 142 includes an aft facing surface 148 and a forward facing surface 150. Aft facing surface 146 of forward rail 140 is oriented toward forward facing surface 150 of aft rail 142. Forward rail 140 defines one or more forward pin orifices 152. Forward pin orifices 152 extend completely through forward rail 140 (i.e., from forward facing surface 144 to aft facing surface 146). Aft rail 142 defines one or more aft pin orifices 154. Aft pin orifices 154 extend completely through aft rail 142 (i.e., from aft facing surface 148 to forward facing surface 150). Each aft pin orifice 154 is axially aligned with a forward pin orifice 152. While forward and aft pin orifices 152, 154 are illustrated as having a circular shape or cross-section, in various embodiments, forward and aft pin orifices 152, 154 may comprise an oval or elliptical shape. An oval or elliptical shape may allow BOAS segment 122 to accommodate thermal expansion of pins 125 and/or of BOAS support 121, with momentary reference to FIG. 2.

Forward rail 140 may be castellated. In this regard, forward rail 140 includes a distal surface 156 and a proximal surface 158. Distal surface 156 and proximal surface 158 are each oriented away from radially outward surface 126. Forward rail 140 comprises a radial height H1 at distal surface 156, and a radial height H2 at proximal surface 158. Radial height H1 is the distance between radially outward surface 126 and distal surface 156. Radial height H2 is the distance between radially outward surface 126 and proximal surface 158. In accordance with various embodiments, radial height H1 is greater than radial height H2. Stated differently, distal surface 156 may be located a greater distance from radially outward surface 126, as compared to proximal surface 158. In various embodiments, forward pin orifices 152 are located in areas comprising radial height H1. Stated differently, forward pin orifices 152 may be aligned radially with distal surface 156.

In various embodiments, a circumferential length of forward rail 140 may be less than the circumferential length of BOAS segment 122. In this regard, forward rail 140 may be located a distance D1 from first circumferential edge 134 and a distance D2 from second circumferential edge 136. In various embodiments, one or more circumferential seal(s), similar to circumferential seals 220 in FIG. 7, may be located circumferentially adjacent to forward rail 140. Forward rail 140 may be located an axial distance D3 from forward edge 130. In various embodiments, a seal may be located forward of forward rail 140. The portion of radially outward surface 126 located between forward rail 140 and forward edge 130 may provide a sealing surface. Stated differently, the portion of radially outward surface 126 located forward of forward rail 140 may form a sealing interface with one or more seals located between BOAS segment 122 and outer vane platform 114 (FIG. 2).

In various embodiments, aft rail 142 may be castellated. In this regard, aft rail 142 includes a distal surface 160 and a proximal surface 162. Distal surface 160 and proximal surface 162 are each oriented away from radially outward surface 126. Aft rail 142 comprises a radial height H3 at distal surface 160, and a radial height H4 at proximal surface 162. Radial height H3 is the distance between radially outward surface 126 and distal surface 160. Radial height H4 is the distance between radially outward surface 126 and proximal surface 162. In accordance with various embodiments, radial height H3 is greater than radial height H4. Stated differently, distal surface 160 may be located a greater distance from radially outward surface 126, as compared to proximal surface 162. In various embodiments, aft pin orifices 154 are located in areas comprising radial height H3. Stated differently, aft pin orifices 154 may be aligned radially with distal surface 160.

In various embodiments, a circumferential length of aft rail 142 may be equal to the circumferential length of BOAS segment 122. In this regard, aft rail 142 may extend from first circumferential edge 134 to second circumferential edge 136 of BOAS segment 122. In various embodiments, aft rail 142 may not be castellated. For example, distal surface 160 may extend continuously from first circumferential edge 134 of BOAS segment 122 to second circumferential edge 136 of BOAS segment 122. In various embodiment, an aft extending lip 168 may be formed proximate a radially inward end of aft rail 142. Lip 168 may reduce or prevent eddy currents downstream (i.e., aft) of BOAS segment 122.

FIGS. 4A and 4B show BOAS segment 122 coupled to BOAS support 121. In accordance with various embodiments, BOAS support 121 may include an aft flange 170. Aft flange 170 is configured to be forward of aft rail 142. BOAS support 121 further includes a first forward flange 172 and a second forward flange 174. Second forward flange 174 is located forward of first forward flange 172 and forward of aft flange 170. First and second forward flanges 172, 174 are configured to receive forward rail 140 of BOAS segment 122. Stated differently, forward rail 140 may be located between first forward flange 172 and second forward flange 174. Aft flange 170 and first and second forward flanges 172, 174 extend radially inward from BOAS support 121. Aft flange 170 defines one or more aft support pin orifices 176 configured to receive pins 125. First forward flange 172 defines one or more forward support pin orifices 178 configured to receive pins 125. Aft support pin orifices 176 are configured to align axially with aft pin orifices 154 (FIG. 3) in aft rail 142. Forward support pin orifices 178 are configured to align axially with forward pin orifices 152 (FIG. 3) in forward rail 140.

Pins 125 are disposed through aft rail 142, aft flange 170, first forward flange 172, and forward rail 140. In various embodiments, first and second forward flanges 172, 174 may each be castellated. In this regard, first forward flange 172 includes a distal surface 190 and a proximal surface 192. Distal surface 190 and proximal surface 192 are each oriented toward radially outward surface 126 of BOAS segment 122. In accordance with various embodiments, distal surface 190 is distal to (i.e., a greater distance from) radially outward surface 126 as compared to proximal surface 192. In various embodiments, forward support pin orifices 178 are located in areas comprising proximal surface 192. Stated differently, forward support pin orifices 178 may be aligned radially with proximal surface 192.

Second forward flange 174 includes a distal surface 194 and a proximal surface 196. Distal surface 194 and proximal surface 196 are each oriented toward radially outward surface 126 of BOAS segment 122. In accordance with various embodiments, distal surface 194 is distal to (i.e., a greater distance from) radially outward surface 126 as compared to proximal surface 196. In various embodiments, the distal surfaces 190, 194 of first and second forward flanges 172, 174 may be aligned axially with the proximal surfaces 158 of forward rail 140. Aligning the distal surfaces 190, 194 and the proximal surfaces 158 may allow fluid (e.g., cooling air) to flow between forward rail 140 and aft rail 142. Aligning the distal surfaces 190, 194 and the proximal surfaces 158 may increase the volume or flowrate of fluid provide to the diffusor holes 138 located axially between forward rail 140 and aft rail 142. In this regard, the castellation of forward rail 140 and of first and second forward flanges 172, 174 may increase cooling of BOAS segment 122 and/or reduce thermal gradient between radially outward surface 126 and radially inward surface 124 of BOAS segment 122.

Figure 5:
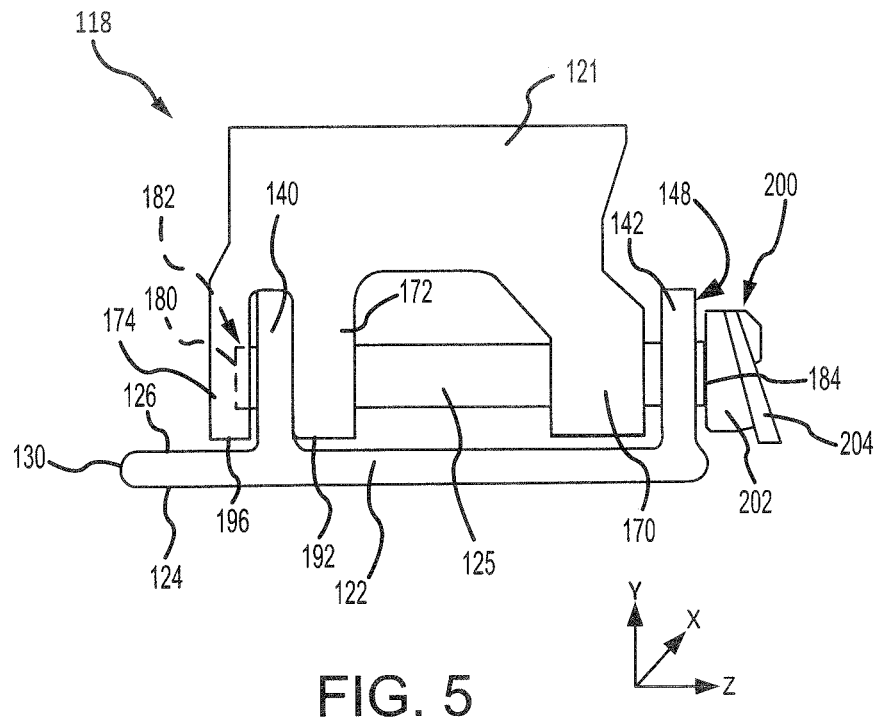
FIG. 5 illustrates a BOAS assembly with axial support pins and an aft seal, in accordance with various embodiments

With reference to FIG. 5, in various embodiments, BOAS assembly 118 may include a seal 200 disposed aft of aft rail 142. A forward end 180 of pin 125 abuts, or otherwise contacts, second forward flange 174. In various embodiments, second forward flange 174 may define a receptacle 182 configured to receive forward end 180 of pin 125. Pin 125 is configured (e.g., an axial length of pin 125 is selected) such that an aft end 184 of pin 125 extends aft from aft facing surface 148 of aft rail 142. Seal 200 may contact aft end 184 of pin 125, rather than aft facing surface 148 of aft rail 142. Thus, any forward load generated by seal 200 will be transmitted through pin 125, rather than through BOAS segment 122. In various embodiments, seal 200 comprises a brush seal having a backing plate 202 and bristles 204 coupled to backing plate 202. Backing plate 202 is configured to contact aft end 184 of pins 125.

Figure 6A:
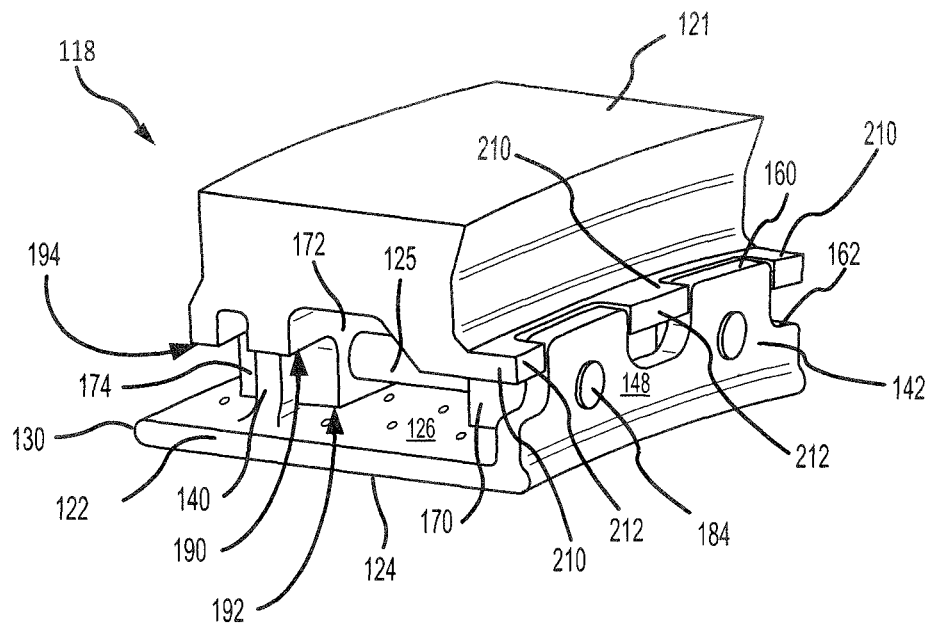
FIGS. 6A and 6B illustrate a BOAS assembly with axial support pins and a BOAS support having axial protrusions.
Figure 6B:
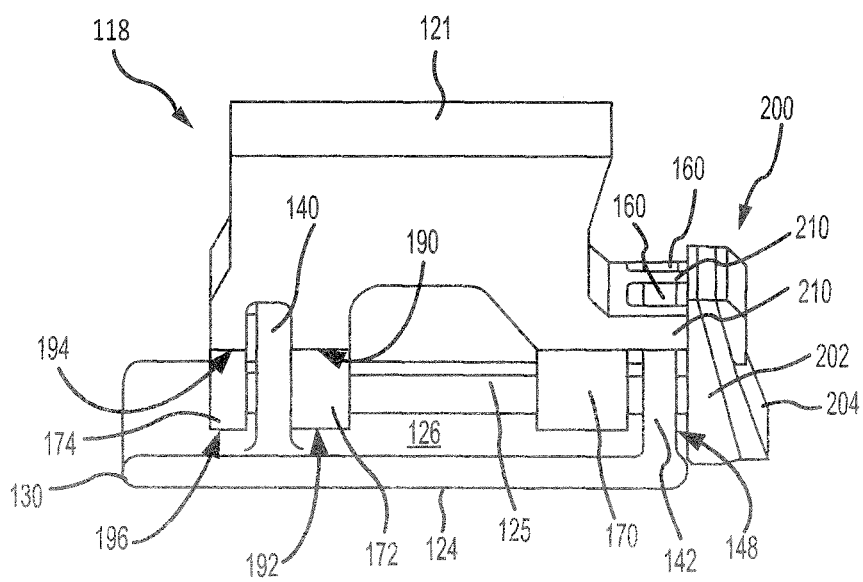

With reference to FIGS. 6A and 6B, in various embodiments, BOAS support 121 may include one or more aft protrusion(s) 210. Aft protrusions 210 may extend aft from aft flange 170 of BOAS support 121. Aft protrusions 210 are configured (e.g., an axial length of aft protrusions 210 is selected) such that an aft end 212 of aft protrusions 210 extends aft from aft facing surface 148 of aft rail 142. Aft protrusions 210 are configured such that seal 200 in FIG. 6B contacts aft end 212 of aft protrusions 210, rather than aft facing surface 148 of aft rail 142. Thus, any forward load generated by seal 200 will be transmitted through aft protrusions 210 and BOAS support 121, rather than through BOAS segment 122. In various embodiments, seal 200 comprises a brush seal having backing plate 202 and bristles 204 coupled to backing plate 202. Backing plate 202 is configured to contact aft end 212 of aft protrusions 210.

In various embodiments, aft protrusions 210 may be aligned radially with the proximal surfaces 162 of aft rail 142 of BOAS segment 122. Stated differently, aft protrusions 210 may be located circumferentially between the portions of aft rail 142 that include distal surface 160.

Figure 7:
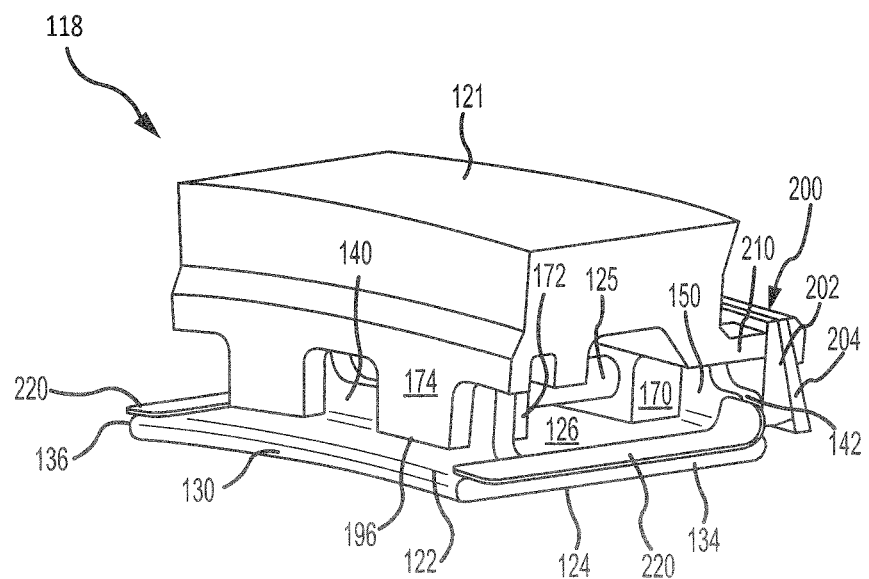
FIG. 7 illustrates a BOAS assembly with axial support pins and circumferential seals, in accordance with various embodiments.

With reference to FIG. 7, in various embodiments, BOAS assembly 118 may include one or more circumferential seal(s) 220. In various embodiments, circumferential seal 220 may comprise a feather seal. Circumferential seal 220 may provide sealing between circumferentially adjacent BOAS segments 122. Circumferential seal 220 may be located on radially outward surface 126 of BOAS segment 122. Circumferential seal 220 may extend from forward facing surface 150 of aft rail 142 to forward edge 130 of BOAS segment 122. Forward rail 140 may be located circumferential adjacent to circumferential seal 220. For example, forward rail 140 may be located circumferentially between a pair of circumferential seals 220.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A blade outer air seal assembly, comprising:
    a blade outer air seal segment comprising a forward rail and an aft rail, wherein the forward rail is castellated;
    a blade outer air seal support coupled to the blade outer air seal segment, the blade outer air seal support comprising an aft flange, a first forward flange, and a second forward flange, the second forward flange being located forward of the first forward flange, wherein the second forward flange is castellated, and wherein a proximal surface of the forward rail is axially aligned with a distal surface of the second forward flange; and
    a pin disposed through the aft rail, the aft flange, the first forward flange, and the forward rail, wherein a forward end of the pin contacts the second forward flange.

2. The blade outer air seal assembly of claim 1, further comprising a seal disposed aft of the aft rail.

3. The blade outer air seal assembly of claim 2, wherein the seal contacts an aft end of the pin.

4. The blade outer air seal assembly of claim 2, wherein the aft flange comprises an aft protrusion, and wherein the seal contacts the aft protrusion.

5. The blade outer air seal assembly of claim 1, wherein the blade outer air seal segment defines a plurality of diffusion holes extending from a radially outward surface of the blade outer air seal segment to a radially inward surface of the blade outer air seal segment.

6. The blade outer air seal assembly of claim 1, further comprising a circumferential seal located circumferentially adjacent to the forward rail, wherein a circumferential length of the forward rail is less than a circumferential length of the blade outer air seal segment.

7. A turbine section of a gas turbine engine, comprising:
    a blade configured to rotate about an engine central longitudinal axis; and
    a blade outer air seal assembly located radially outward of the blade, the blade outer air seal assembly comprising:

a blade outer air seal segment including a forward rail and an aft rail, wherein the forward rail is castellated;

a blade outer air seal support coupled to the blade outer air seal segment, the blade outer air seal support comprising an aft flange, a first forward flange, and a second forward flange, the second forward flange being located forward of the first forward flange, wherein the second forward flange is castellated, and wherein a proximal surface of the forward rail is axially aligned with a distal surface of the second forward flange; and a pin disposed through the aft rail, the aft flange, the first forward flange, and the forward rail.

8. The turbine section of claim 7, wherein the blade outer air seal assembly further comprises a seal disposed aft of the aft rail, and wherein the seal contacts an aft end of the pin.

9. The turbine section of claim 7, wherein the blade outer air seal assembly further comprises a seal disposed aft of the aft rail, and wherein the seal contacts an aft protrusion extending from the aft flange.

10. The turbine section of claim 9, wherein the seal comprises a brush seal, the brush seal including a backing plate and a plurality of bristles coupled to the backing plate, and wherein the backing plate contacts the aft protrusion.

11. The turbine section of claim 7, wherein a forward end of the pin contacts the second forward flange.

12. The turbine section of claim 11, wherein the second forward flange defines a pin receptacle, and wherein the forward end of the pin is located within the pin receptacle.

13. A blade assembly of a gas turbine engine, comprising:
a blade configured to rotate about an axis; and
a blade outer air seal assembly located radially outward of the blade, the blade outer air seal assembly comprising:

a blade outer air seal segment including a forward rail and an aft rail, wherein the forward rail is castellated, a blade outer air seal support coupled to the blade outer air seal segment, the blade outer air seal support comprising an aft flange, a first forward flange, and a second forward flange, the second forward flange being located forward of the first forward flange, wherein the second forward flange is castellated, and wherein a proximal surface of the forward rail is axially aligned with a distal surface of the second forward flange; and a pin disposed through the aft rail, the aft flange, the first forward flange, and the forward rail.

14. The blade assembly of claim 13, wherein a forward end of the pin contacts the second forward flange.

15. The blade assembly of claim 13, wherein the blade outer air seal assembly further comprises a seal disposed aft of the aft rail, and wherein the seal contacts an aft end of the pin.

16. The blade assembly of claim 14, wherein the blade outer air seal assembly further comprises a seal disposed aft of the aft rail, and wherein the seal contacts an aft protrusion extending from the aft flange.

\* \* \* \* \*